(12) United States Patent
Tableman

(10) Patent No.: US 10,659,433 B2
(45) Date of Patent: May 19, 2020

(54) ENCRYPTING AND SECURING DATA WITH REVERSE PROXIES ACROSS FRAMES IN AN ON-DEMAND SERVICES ENVIRONMENT

(71) Applicant: salesforce.com, inc., San Francisco, CA (US)

(72) Inventor: Nathan E Tableman, Hoboken, NJ (US)

(73) Assignee: salesforce.com, inc., San Francisco, CA (US)

( * ) Notice: Subject to any disclaimer, the term of this patent is extended or adjusted under 35 U.S.C. 154(b) by 210 days.

(21) Appl. No.: 15/365,875

(22) Filed: Nov. 30, 2016

(65) Prior Publication Data

US 2018/0152418 A1    May 31, 2018

(51) Int. Cl.
*H04L 29/06* (2006.01)
*G06F 21/60* (2013.01)
*H04L 29/08* (2006.01)
*G06F 21/62* (2013.01)

(52) U.S. Cl.
CPC ........ *H04L 63/0281* (2013.01); *G06F 21/606* (2013.01); *G06F 21/6245* (2013.01); *G06F 21/6254* (2013.01); *H04L 63/0471* (2013.01); *H04L 67/2857* (2013.01); *G06F 2221/2111* (2013.01); *H04L 63/107* (2013.01); *H04L 67/28* (2013.01); *H04L 2209/76* (2013.01)

(58) Field of Classification Search
CPC .............. G06F 21/606; G06F 21/6218; G06F 21/6245; G06F 21/6254; G06F 62/6254; H04L 63/0471; H04L 63/0492; H04L 67/28; H04L 63/0281; H04L 67/2857
USPC ...................................... 726/12, 26; 713/189
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

*Primary Examiner* — Shanto Abedin
(74) *Attorney, Agent, or Firm* — Jeffery, Watson, Mendonsa & Hamiiton, LLP

(57) ABSTRACT

In accordance with embodiments, there are provided mechanisms and methods for facilitating protection of data in a database environment in an on-demand services environment according to one embodiment. In one embodiment and by way of example, a method includes detecting, by a first computing device in the database environment, sensitive data associated with a user having access to a second computing device, where the sensitive data is capable of being communicated within a geographic residency. The method may further include performing, by the first computing device, secured communication of the sensitive data between at least one of multiple computing devices and multiple application frames within the geographic residency, wherein the first computing device includes a proxy server that is locally situated within the geographic residency.

9 Claims, 8 Drawing Sheets

(56) References Cited

U.S. PATENT DOCUMENTS

| | | | |
|---|---|---|---|
| 5,963,953 | A | 10/1999 | Cram et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec |
| 6,324,693 | B1 | 11/2001 | Brodersen et al. |
| 6,336,137 | B1 | 1/2002 | Lee et al. |
| D454,139 | S | 3/2002 | Feldcamp |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker et al. |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,289,976 | B2 | 10/2007 | Kihneman et al. |
| 7,340,411 | B2 | 3/2008 | Cook |
| 7,620,655 | B2 | 11/2009 | Larsson et al. |
| 2001/0044791 | A1 | 11/2001 | Richter et al. |
| 2002/0022986 | A1 | 2/2002 | Coker et al. |
| 2002/0029161 | A1 | 3/2002 | Brodersen et al. |
| 2002/0029376 | A1 | 3/2002 | Ambrose et al. |
| 2002/0035577 | A1 | 3/2002 | Brodersen et al. |
| 2002/0042264 | A1 | 4/2002 | Kim |
| 2002/0042843 | A1 | 4/2002 | Diec |
| 2002/0072951 | A1 | 6/2002 | Lee et al. |
| 2002/0082892 | A1 | 6/2002 | Raffel et al. |
| 2002/0129352 | A1 | 9/2002 | Brodersen et al. |
| 2002/0140731 | A1 | 10/2002 | Subramaniam et al. |
| 2002/0143997 | A1 | 10/2002 | Huang et al. |
| 2002/0152102 | A1 | 10/2002 | Brodersen et al. |
| 2002/0161734 | A1 | 10/2002 | Stauber et al. |
| 2002/0162090 | A1 | 10/2002 | Parnell et al. |
| 2002/0165742 | A1 | 11/2002 | Robins |
| 2003/0004971 | A1 | 1/2003 | Gong et al. |
| 2003/0018705 | A1 | 1/2003 | Chen et al. |
| 2003/0018830 | A1 | 1/2003 | Chen et al. |
| 2003/0066031 | A1 | 4/2003 | Laane |
| 2003/0066032 | A1 | 4/2003 | Ramachadran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker |
| 2003/0088545 | A1 | 5/2003 | Subramaniam et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec |
| 2003/0189600 | A1 | 10/2003 | Gune et al. |
| 2003/0191743 | A1 | 10/2003 | Brodersen et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2004/0001092 | A1 | 1/2004 | Rothwein et al. |
| 2004/0010489 | A1 | 1/2004 | Rio |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan, Jr. et al. |
| 2004/0199489 | A1 | 10/2004 | Barnes-Leon et al. |
| 2004/0199536 | A1 | 10/2004 | Barnes-Leon et al. |
| 2004/0199543 | A1 | 10/2004 | Braud et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2009/0177744 | A1 | 7/2009 | Marlow et al. |
| 2009/0249082 | A1* | 10/2009 | Mattsson ............ G06F 21/6218 713/193 |
| 2010/0070754 | A1* | 3/2010 | Leach ................. G06F 21/6254 713/152 |
| 2011/0222549 | A1* | 9/2011 | Connelly .................. G06F 8/65 370/401 |
| 2012/0278504 | A1* | 11/2012 | Ang .................... H04L 61/2596 709/246 |
| 2012/0278621 | A1* | 11/2012 | Woloszyn ........... H04L 61/2596 713/168 |
| 2013/0212666 | A1* | 8/2013 | Mattsson ............ G06Q 20/405 726/9 |
| 2014/0020072 | A1* | 1/2014 | Thomas .............. H04L 63/0815 726/7 |
| 2014/0232861 | A1* | 8/2014 | Naidoo .................... H04N 7/18 348/143 |
| 2014/0337926 | A1* | 11/2014 | Shannon ............... H04L 63/102 726/4 |
| 2015/0263886 | A1* | 9/2015 | Wang ...................... H04L 41/08 370/254 |
| 2015/0326613 | A1* | 11/2015 | Devarajan ............. G06F 21/51 726/1 |
| 2016/0036921 | A1* | 2/2016 | Sama ..................... H04L 63/10 726/4 |
| 2016/0055482 | A1* | 2/2016 | Mattsson ............ G06Q 20/405 705/65 |
| 2016/0092696 | A1* | 3/2016 | Guglani .............. G06F 21/6245 726/26 |
| 2017/0116428 | A1* | 4/2017 | Wu ...................... G06F 21/6209 |
| 2017/0359313 | A1* | 12/2017 | Livneh ................ H04L 63/0414 |
| 2018/0115625 | A1* | 4/2018 | Livneh ................ G06F 21/6254 |

\* cited by examiner

450

451 — MONITOR DATA BEING COMMUNICATED BETWEEN MULTIPLE COMPUTING ENTITIES, APPLICATION FRAMES, ETC., WITHIN A GEOGRAPHIC RESIDENCY

453 — SECURELY TOKENIZE AND/OR ENCRYPT THE DATA, INCLUDING OR AT LEAST ANY SENSITIVE DATA USING A (REVERSE) PROXY SERVER AND A TOKEN DATABASE WITHIN THE GEOGRAPHIC RESIDENCY

455 — USING THE (REVERSE) PROXY SERVER AND/OR TOKEN DATABASE, ENSURE SECURE COMMUNICATION OF THE TOKENIZED/ENCRYPTED DATA BETWEEN MULTIPLE COMPUTING ENTITIES WITHIN THE GEOGRAPHIC RESIDENCY, WITHOUT HAVING TO REACH OUT TO OTHER REMOTE COMPUTING DEVICES OVER NETWORKS

457 — USING THE (REVERSE) PROXY SERVER AND/OR TOKEN DATABASE, ENSURE SECURE COMMUNICATION OF THE TOKENIZED/ENCRYPTED DATA BETWEEN MULTIPLE APPLICATION FRAMES WITHIN THE GEOGRAPHIC RESIDENCY, WITHOUT HAVING TO REACH OUT TO OTHER REMOTE COMPUTING DEVICES OVER NETWORKS

459 — RECEIVE, DECRYPT, AND VIEW THE TOKENIZED/ENCRYPTED DATA AT A CLIENT COMPUTING DEVICE USING ONE OR MORE ENCRYPTION/ DECRYPTION TECHNIQUES VIA ONE OR MORE INTERFACES VIA ONE OR MORE DISPLAY SCREENS/DEVICES

*FIG. 4B*

ENCRYPTING AND SECURING DATA WITH REVERSE PROXIES ACROSS FRAMES IN AN ON-DEMAND SERVICES ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to facilitating encryption and security of data with reverse proxies across frames in an on-demand services environment.

BACKGROUND

Databases are commonly used to store large amounts of data. As the amount of data increase, so too does the amount of sensitive data. When it comes to sensitive data, a single data breach can seriously impact a service provider's business, including loss of trust and business. For example, when building a web-based application, data is often communicated across frames or sections of the web application and since these frames may relate to or come from various sources, it is contemplated that one or more portions, including sensitive portions, of the data may be unnecessarily leaked.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

FIG. 4B illustrates a method for facilitating security of data according to one embodiment;

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Methods and systems are provided for facilitating encryption and security of data with reverse proxies across frames in an on-demand services environment.

Embodiments provide for control of communication of data over or across multiple frames. For example, embodiments provide for tokenization and/or encryption of sensitive data as it traverses frames for any number of reasons, such as security, regulatory parameters, and/or network flow concerns. This tokenization and/or encryption of data may be applicable in any number or type of situations, such as (without limitation) in context of cloud-based services when combined with on-premises data services where an enterprise might be concerned with control over security of data in the cloud or when dealing with multiple geographical locations or residences of the data.

It is contemplated that embodiments and their implementations are not merely limited to multi-tenant database system ("MTDBS") and can be used in other environment, such as a client-server system, a mobile device, a personal computer ("PC"), a web services environment, etc. However, for the sake of brevity and clarity, throughout this document, embodiments are described with respect to a multi-tenant database system, such as Salesforce.com®, which is to be regarded as an example of an on-demand services environment. Other on-demand services environments include Salesforce® Exact Target Marketing Cloud™.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

Figure 1:
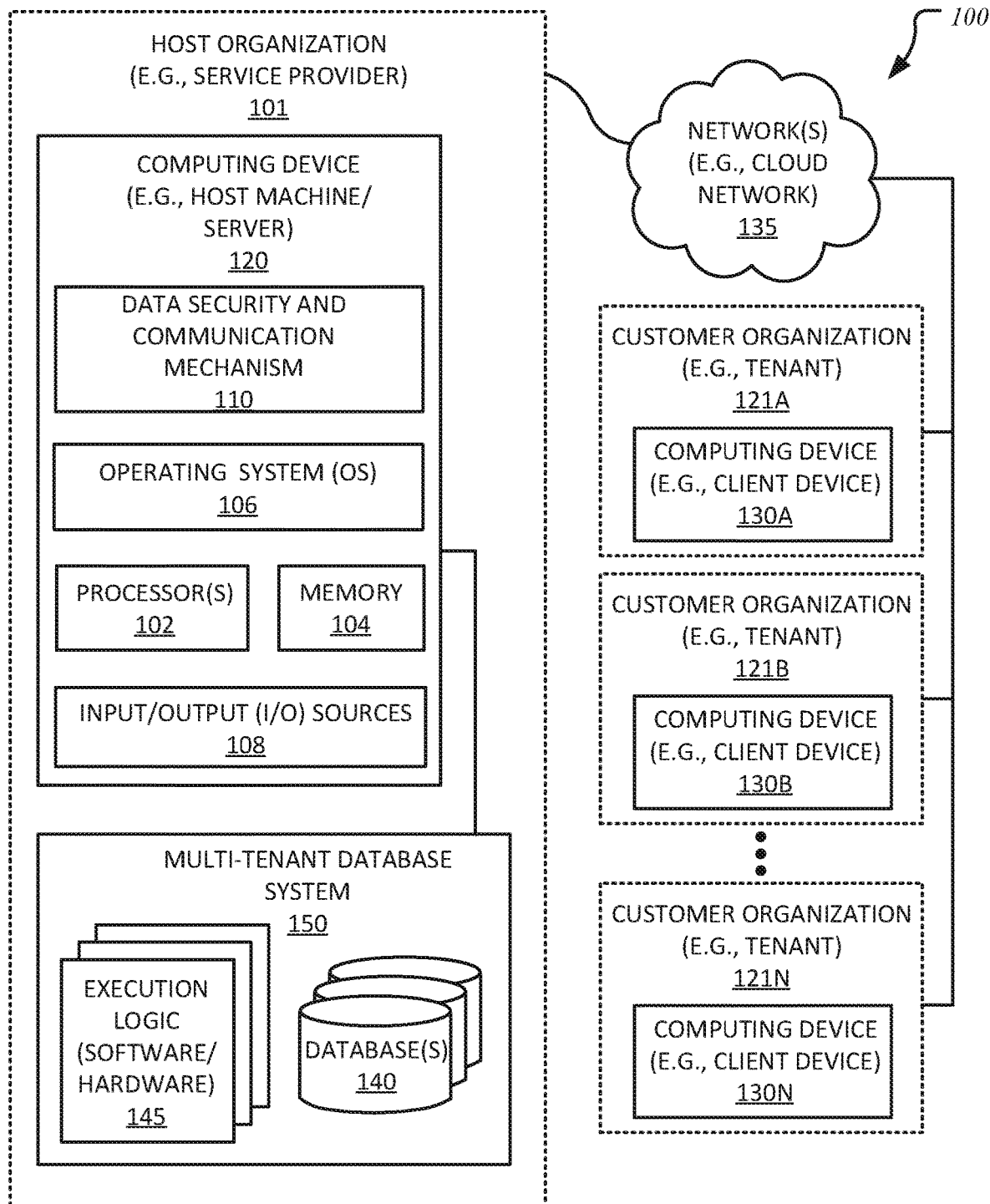
FIG. 1 illustrates a system having a computing device employing data security and communication mechanism according to one embodiment.

FIG. 1 illustrates a system 100 having a computing device 120 employing data security and communication mechanism 110 according to one embodiment. In one embodiment, computing device 120 includes a host server computer serving a host machine for employing data security and communication mechanism ("security mechanism") 110 for facilitating controlled execution, including rewriting, of queries for generating selective query responses in a multi-tiered, multi-tenant, on-demand services environment.

It is to be noted that terms like "queue message", "job", "query", "request" or simply "message" may be referenced interchangeably and similarly, terms like "job types", "message types", "query type", and "request type" may be referenced interchangeably throughout this document. It is to be further noted that messages may be associated with one or more message types, which may relate to or be associated with one or more customer organizations, such as customer organizations 121A-121N, where, as aforementioned, throughout this document, "customer organizations" may be referred to as "tenants", "customers", or simply "organizations". An organization, for example, may include or refer to (without limitation) a business (e.g., small business, big business, etc.), a company, a corporation, a non-profit entity, an institution (e.g., educational institution), an agency (e.g., government agency), etc.), etc., serving as a customer or client of host organization 101 (also referred to as "service provider" or simply "host"), such as Salesforce.com®, serving as a host of security mechanism 110.

Similarly, the term "user" may refer to a system user, such as (without limitation) a software/application developer, a system administrator, a database administrator, an information technology professional, a program manager, product manager, etc. The term "user" may further refer to an end-user, such as (without limitation) one or more of customer organizations 121A-N and/or their representatives (e.g., individuals or groups working on behalf of one or more of customer organizations 121A-N), such as a salesperson, a sales manager, a product manager, an accountant, a director, an owner, a president, a system administrator, a computer programmer, an information technology ("IT") representative, etc.

Computing device 120 may include (without limitation) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130A-130N, etc. Computing device 120 further includes processor(s) 102, memory 104, input/output ("I/O") sources 108, such as touchscreens, touch panels, touch pads, virtual or regular keyboards, virtual or regular mice, etc.

In one embodiment, host organization 101 may further employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated multi-tenant database system 150 includes database(s) 140 to store (without limitation) information, relational tables, datasets, and underlying database records having tenant and user data therein on behalf of customer organizations 121A-N (e.g., tenants of multi-tenant database system 150 or their affiliated users). In alternative embodiments, a client-server computing architecture may be utilized in place of multi-tenant database system 150, or alternatively, a computing grid, or a pool of work servers, or some combination of hosted computing architectures may be utilized to carry out the computational workload and processing that is expected of host organization 101.

The illustrated multi-tenant database system 150 is shown to include one or more of underlying hardware, software, and logic elements 145 that implement, for example, database functionality and a code execution environment within host organization 101. In accordance with one embodiment, multi-tenant database system 150 further implements databases 140 to service database queries and other data interactions with the databases 140. In one embodiment, hardware, software, and logic elements 145 of multi-tenant database system 130 and its other elements, such as a distributed file store, a query interface, etc., may be separate and distinct from customer organizations (121A-121N) which utilize the services provided by host organization 101 by communicably interfacing with host organization 101 via network(s) 135 (e.g., cloud network, the Internet, etc.). In such a way, host organization 101 may implement on-demand services, on-demand database services, cloud computing services, etc., to subscribing customer organizations 121A-121N.

In some embodiments, host organization 101 receives input and other requests from a plurality of customer organizations 121A-N over one or more networks 135; for example, incoming search queries, database queries, application programming interface ("API") requests, interactions with displayed graphical user interfaces and displays at client devices 130A-N, or other inputs may be received from customer organizations 121A-N to be processed against multi-tenant database system 150 as queries via a query interface and stored at a distributed file store, pursuant to which results are then returned to an originator or requestor, such as a user of client devices 130A-N at any of customer organizations 121A-N.

As aforementioned, in one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101 and its multi-tenant database system 150. For example, incoming requests received at the web server may specify which services from host organization 101 are to be provided, such as query requests, search request, status requests, database transactions, graphical user interface requests and interactions, processing requests to retrieve, update, or store data on behalf of one of customer organizations 121A-N, code execution requests, and so forth. Further, the web-server at host organization 101 may be responsible for receiving requests from various customer organizations 121A-N via network(s) 135 on behalf of the query interface and for providing a web-based interface or other graphical displays to one or more end-user client devices 130A-N or machines originating such data requests.

Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

It is to be noted that any references to software codes, data and/or metadata (e.g., Customer Relationship Model ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™ code, JavaScript™, jQuery™, Developerforce™, Visualforce™, Service Cloud Console Integration Toolkit ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request", and "message" may be used interchangeably throughout this document.

Figure 2:
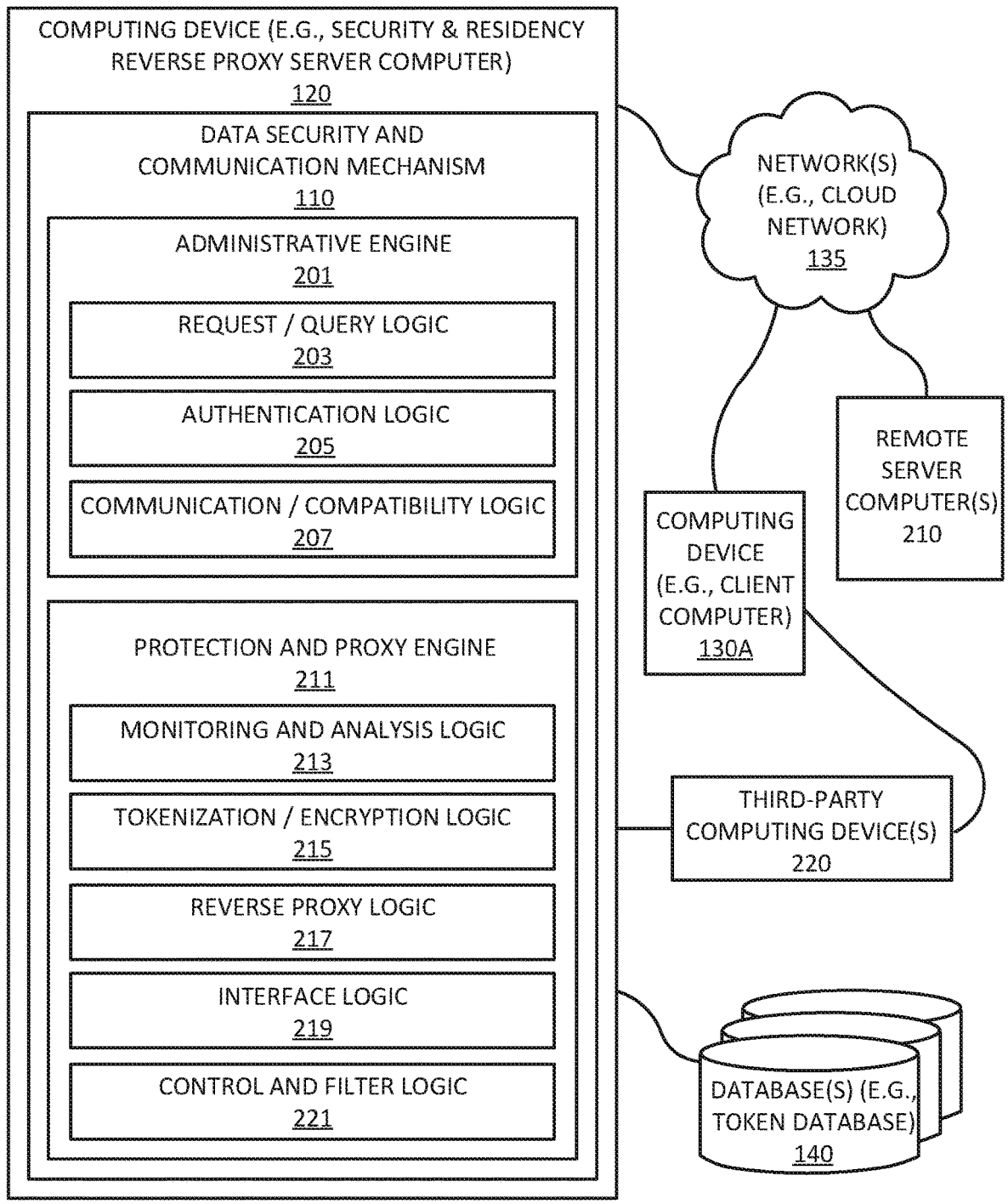
FIG. 2 illustrates a data security and communication mechanism according to one embodiment.

FIG. 2 illustrates a data security and communication mechanism 110 according to one embodiment. In one embodiment, security mechanism 110 may include any number and type of components, such as administration engine 201 having (without limitation): request/query logic 203; authentication logic 205; and communication/compatibility logic 207. Similarly, security mechanism 110 may further include protection and proxy engine 211 including (without limitation): monitoring and analysis logic 213; tokenization/encryption logic 215; reverse proxy logic 217; and interface logic 219.

Figure 3:
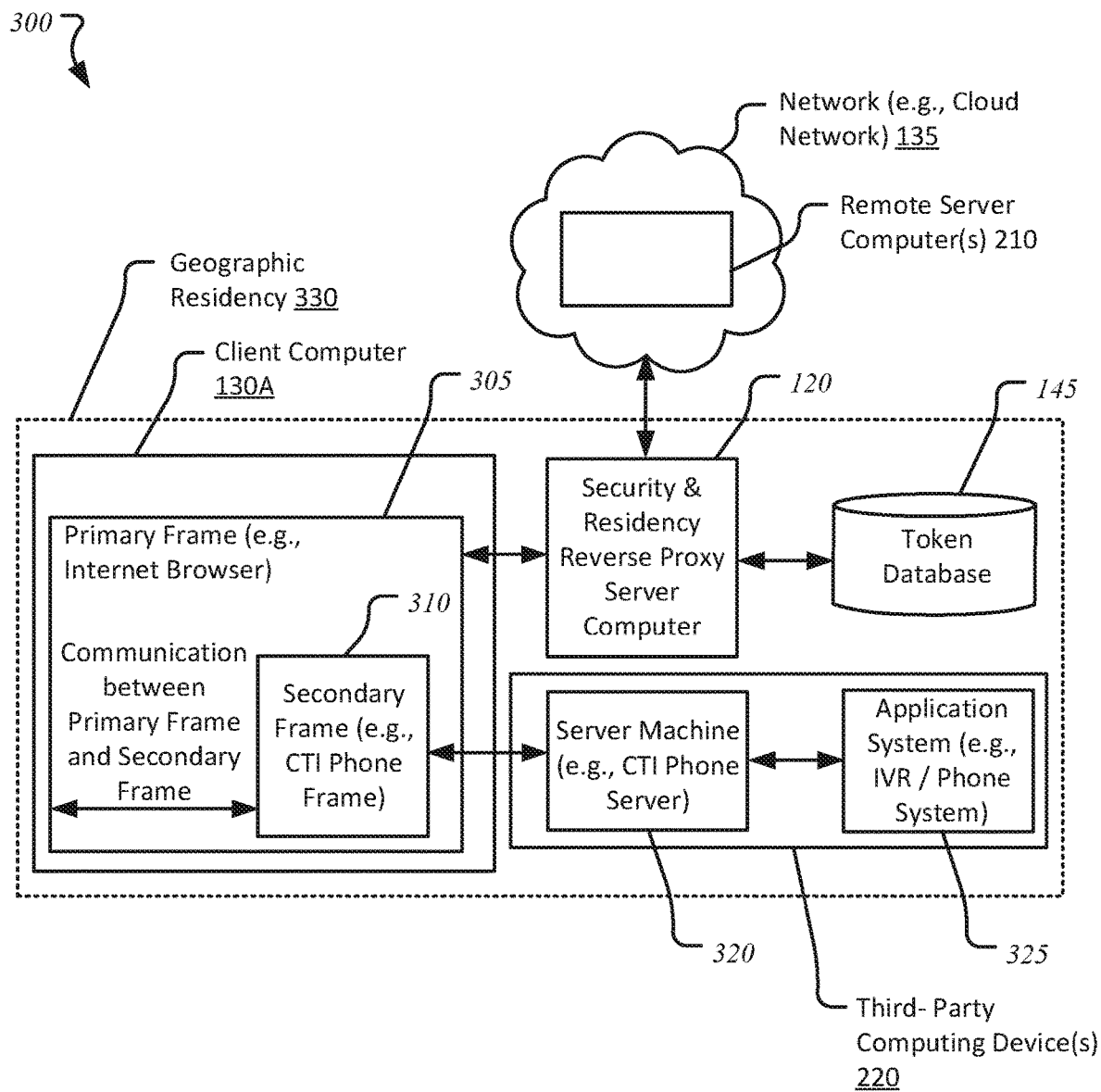
FIG. 3 illustrates an architectural setup for facilitating security of data according to one embodiment.

In one embodiment, computing device 120 may serve as a proxy server (also referred to as "reverse proxy server") belonging to and/or being managed by a service provider (e.g., Salesforce.com®) for hosting and maintaining security mechanism 110 and be in communication with one or more database(s) 140, one or more client computers, such as client computing device 130A, over one or more network(s) 135, and any number and type of dedicated nodes as will be further described with reference to FIG. 3.

Throughout this document, terms like "framework", "mechanism", "engine", "logic", "component", "module", "tool", and "builder" may be referenced interchangeably and include, by way of example, software, hardware, and/or any combination of software and hardware, such as firmware. Further, any use of a particular brand, word, or term, such as "data security", "data communication", "sensitive data", "non-sensitive data", "tokenization", "encryption", "proxy", "reverse proxy", "reverse proxy server", "geographic location", "data residence", etc., should not be read to limit embodiments to software or devices that carry that label in products or in literature external to this document.

As aforementioned, with respect to FIG. 1, any number and type of requests and/or queries may be received at or submitted to request/query logic 203 for processing. For example, incoming requests may specify which services from computing device 120 are to be provided, such as query requests, search request, status requests, database transactions, graphical user interface requests and interactions, processing requests to retrieve, update, or store data, etc., on behalf of client device 130A, code execution requests, and so forth.

In one embodiment, computing device 120 may implement request/query logic 203 to serve as a request/query interface via a web server or as a stand-alone interface to receive requests packets or other requests from client devices 130A. The request interface may further support the return of response packets or other replies and responses in an outgoing direction from computing device 120 to client device 130A.

Similarly, request/query logic 203 may serve as a query interface to provide additional functionalities to pass queries from, for example, a web service into the multi-tenant database system for execution against database(s) 140 and retrieval of customer data and stored records without the involvement of the multi-tenant database system or for processing search queries via the multi-tenant database system, as well as for the retrieval and processing of data maintained by other available data stores of the host organization's production environment. Further, authentication logic 205 may operate on behalf of the host organization, via computing device 120, to verify, authenticate, and authorize, user credentials associated with users attempting to gain access to the host organization via client device 130A.

In one embodiment, computing device 120 may include a server computer which may be further in communication with one or more databases or storage repositories, such as database(s) 140, which may be located locally or remotely over one or more networks, such as network(s) 235 (e.g., cloud network, Internet, proximity network, intranet, Internet of Things ("IoT"), Cloud of Things ("CoT"), etc.). Computing device 120 is further shown to be in communication with any number and type of other computing devices, such as client computing device 130A, remote server computer 210, third-party computing device 220, one or more databases 140, over one or more network(s) 140.

In one embodiment, as illustrated, security mechanism 110 further includes protection and proxy engine 211 to allow for protection or security of data through tokenization and/or encryption. For example, a novel technique is provided for securing data during communication over multiple frames through any number and type of systems, such as client computing device 130A, third-party computing device 220, etc., through tokenization or encryption through proxy server computing device 120.

In one embodiment, computing device 120, serving as a proxy server, may be placed locally to facilitate data communication between multiple entities, such as client computing device 130A, third-party computing device 220, etc., and further provides for a novel technique to secure the data being communicated between such entities without having to engage or burden remote server computer 210. Computing device 120, serving as a proxy server, may also be in communication with one or more token databases, such as one or more of database(s) 140. Other entities may include one or more remote servers, such as remote server computer 210, associated with a service provider, which may be a cloud-based service computer where data may be stored to meet certain regulatory protocols or requirements.

For example, client computing device 130A may include (without limitation) a desktop computer, a laptop computer, a mobile computing device, etc., that is capable of employing and providing any number and type of software applications, interfaces, etc., where computing device 130A is accessible to a user. Similarly, third-party computing device 220 may include a third-party system to provide any number of services to the user of computing device 130A, such as a platform for building web-based applications, telephone services, data services, and/or the like. For example, third-party computing device 220 may include or provide one or more of (without limitation) computer telephony integration (CTI) server computers, interactive voice response (IVR)/phone systems, etc.

Some of the data being communicated between multiple entities 120, 130A, 140, 220 over network(s) 140 may include both non-sensitive and sensitive data, where sensitive data may include (without limitation) unique user identification (ID), social security number (SSN), date of birth, mother's maiden name, client ID, employee ID, automatic number identification (ANI) (or simply "caller ID"), etc. In one embodiment, monitoring and analysis logic 213 of protection and proxy engine 211 may be used to continuously or periodically monitor any data being communicated over multiple entities and between their respective frames and as such, analyze the data to determine whether the data might contain any sensitive data.

In some embodiments, normal communication may be promoted when the data may not include any sensitive information, while in other embodiments, any data having sensitive data may be communicated with relevant protection as offered through proxy server 120 and facilitated by protection and proxy engine 211.

For example, to secure communication of sensitive data, in one embodiment, as facilitated by reverse proxy logic 217, proxy server 120 is locally employed and facilitated to offer communication of data between participating entities, such as client computing device 130A, database(s) 140, third-party computing device 220, etc., without involving or seeking participation of other less-relevant entities, such as remove cloud-based server computing device 210, to minimize the communication and exposure of any sensitive data and, in turn, maintaining the geographic residency of the data by keeping its communication within the geographic location or residency (such as not having to communicate the data with remote server computer 210) and thus, significantly reducing the chances of any sensitive data being leaked or compromised in any manner to those who might be unauthorized to receive or view such data.

Moreover, in one embodiment, as facilitated by tokenization/encryption logic 215, any data having sensitive data may be tokenized and/or encrypted so that the data is additionally secured even if leaked or compromised. For example, in one embodiment, tokenization/encryption logic 215 may be used to trigger proxy server 120 to serve to perform tokenization or encryption of the data and respond with corresponding tokenized or encrypted values, such as using data residency option (DRO) for tokenizing or encrypting of data based on geographical locations of the data and thus controlling geographical residency of the data.

It is to be noted that terms like "location", "residency", and "premises" may be interchangeably or synonymously used throughout this document.

It is contemplated that the entire process may be triggered based on a performance of an application task or placement of a query, etc., such as upon a query being placed by a user associated with a tenant, receive or detected by request/query logic 203, and forwarded on to protection and proxy engine 211 for further processing. For example, this query may be detected and then monitored for the relevant data by monitoring and analysis logic 213 to determined whether the relevant data includes any sensitive data/information, such as whether any of this sensitive data might be part of a response to the query and/or communicated over network(s) 135 between multiple entities, such as client computer 130A, third party computing device 220, etc.

In this, other components 215, 217, 219 of protection and proxy engine 211 may be triggered so that at least the sensitive data is limited and protected within its geographical residency. For example, in one embodiment, as opposed to seeking counseling or information from one or more remote servers, such as server computer 210, local and geographically-friendly (reverse) proxy server 120 is triggered and used by reverse proxy logic 217 to ensure any relevant information is obtained from a local (as opposed to a remote) database, such as one or more of database(s) 140, and processed locally by proxy server 120 without having to access any information or seeking processing help from any remote databases or servers, respectively, such as server computer 210.

Similarly, in one embodiment, tokenization/encryption logic 215 is triggered to ensure that at least the sensitive data is tokenized and/or encrypted using any one or more of tokenization and/or encryption techniques to further secure the sensitive data such that any data being communicated between multiple entities, such as client computer 130A, third-party computing device 220, etc., over network(s) 135 are fully secured and protected. For example, prior to communicating any data over frames associated with one or more applications, such as a phone application supported by a phone server, such as third-party computing device 220, is first tokenized or encrypted, such as fully or at least partially encoded using one or more tokenization/encryption techniques, as facilitated by reverse proxy logic 217, and then decoded prior upon reaching its destination frame (such as a website as offered by an Internet browser at client computer 130A) as facilitated by reverse proxy logic 217 and/or any local tokenization/encryption application at client computer 130A.

Continuing with the above example, the website at client computer 130A may be offered through a interface, such as an Internet browser, as facilitated by interface logic 219 or any other interfacing logic locally residing at client computer 130A, where this Internet browser may be referred to as a main or primary frame, while any websites may be regarded as secondary frames within the primary frame. For example, a Voice over Internet Protocol (VoIP)-based telephone application (e.g., Skype®, etc.) may be proved through a website and be regarded as a secondary frame (such as phone frame) within the primary frame (such as the browser frame). In one embodiment, having at least the sensitive data protected through tokenization and/or encryption as facilitated by tokenization/encryption logic 215 ensures that the data is secured even when communicated between frames, such as between primary and secondary frames or simply between multiple secondary frames, etc.

In some embodiments, all data being communicated between multiple entities and/or frames may be secured, while in some other embodiments, merely the sensitive data be secured as detected and determined by mapping and analysis logic 213. Further, for example, communication/compatibility logic 207 may be used to communicate the data to the user through one or more interfaces using one or more display screens/devices associated with client computer 130A as facilitated by interface logic 219. It is contemplated that an interface is not limited to any particular number or type of interfaces and may include (without limitation) one or more of a user interface (such as a web browser, a Graphical User Interface (GUI), a software application-based interface, etc.), an application programming interface (API), a Representational State Transfer (REST) or RESTful API, and/or the like.

It is contemplated that a tenant may include an organization of any size or type, such as a business, a company, a corporation, a government agency, a philanthropic or non-profit entity, an educational institution, etc., having single or multiple departments (e.g., accounting, marketing, legal, etc.), single or multiple layers of authority (e.g., C-level positions, directors, managers, receptionists, etc.), single or multiple types of businesses or sub-organizations (e.g., sodas, snacks, restaurants, sponsorships, charitable foundation, services, skills, time etc.) and/or the like.

Communication/compatibility logic 207 may facilitate the ability to dynamically communicate and stay configured with any number and type of software/application developing tools, models, data processing servers, database platforms and architectures, programming languages and their corresponding platforms, etc., while ensuring compatibility with changing technologies, parameters, protocols, standards, etc.

It is contemplated that any number and type of components may be added to and/or removed from security mechanism 110 to facilitate various embodiments including adding, removing, and/or enhancing certain features. It is contemplated that embodiments are not limited to any particular technology, topology, system, architecture, and/or standard and are dynamic enough to adopt and adapt to any future changes.

FIG. 3 illustrates an architectural setup 300 for facilitating security of data according to one embodiment. It is contemplated and to be noted that embodiments are not limited to any particular architectural setup, such as this setup 300, or any of its components or placement of such components. Further, for brevity, clarity, and ease of understanding, many of the components and processes described with respect to FIGS. 1-2 may not be repeated or discussed hereafter.

It is further contemplated that one or more tasks being performed within the illustrated architectural setup may be performed by processing logic that may comprise hardware (e.g., circuitry, dedicated logic, programmable logic, etc.), software (such as instructions run on a processing device), or a combination thereof, such as performed or facilitated by one or more components of security mechanism 110 of FIG. 2.

In one embodiment, architectural setup 300 may include proxy server 120, client computer 130A, token database 145, third-party computing device 220, and remote server computer 210, etc. For example, in case of a phone application (e.g., VoIP, such as Skype®), third-party computing device 220 may include or offer one or more of CTI phone server computer 320, IVR/phone system 325, etc., which may be in communication with a user's client computer 130A hosting a display screen providing an interface, such as an Internet browser, serving as primary frame 305, which further offers one or more frames associated with the phone application, such as a phone application frame serving as secondary frame 310.

As illustrated, secondary frame 310 is shown in communication with primary frame 305 which, in turn, reflect that any amount and type of data (e.g., phone data) including sensitive data (e.g., caller ID, SSN, employee ID, data of birth, etc.) may be communicated between primary and secondary frames 305, 310. For example, a call placed by a caller/user using secondary frame 310 at client computer 120 may then be communicated with secondary frame 305 and then processed by phone server 320, phone system 325, etc., of third-party computing device 220.

In one embodiment, proxy server 120 may be used to facilitate this communication of data between third-party computing device 220 and client computer 130A while ensuring that the communication remains within geographic residency 330, such as without having to leave geographic residency 330 or contact any remote computers, such as server computer 210, over network 135, such as a cloud network.

Further, in one embodiment, proxy server 120 is shown in communication with token database 145 that may be part of one or more database(s) 140 of FIG. 2. In one embodiment, this token database 145 may include tokens or encryption protocols to work with proxy server 120 to perform tokenization and/or encryption of at least the sensitive data of the data being communicated between multiple entities, such as client computer 130A, third-party computing device 220, etc., and further, between multiple frames, such as primary and secondary frames 305, 310, etc., without having to depart geographic residency 330 or access or contact any remote databases or computing devices, such as remote server computer 210 over network 135.

Figure 4A:
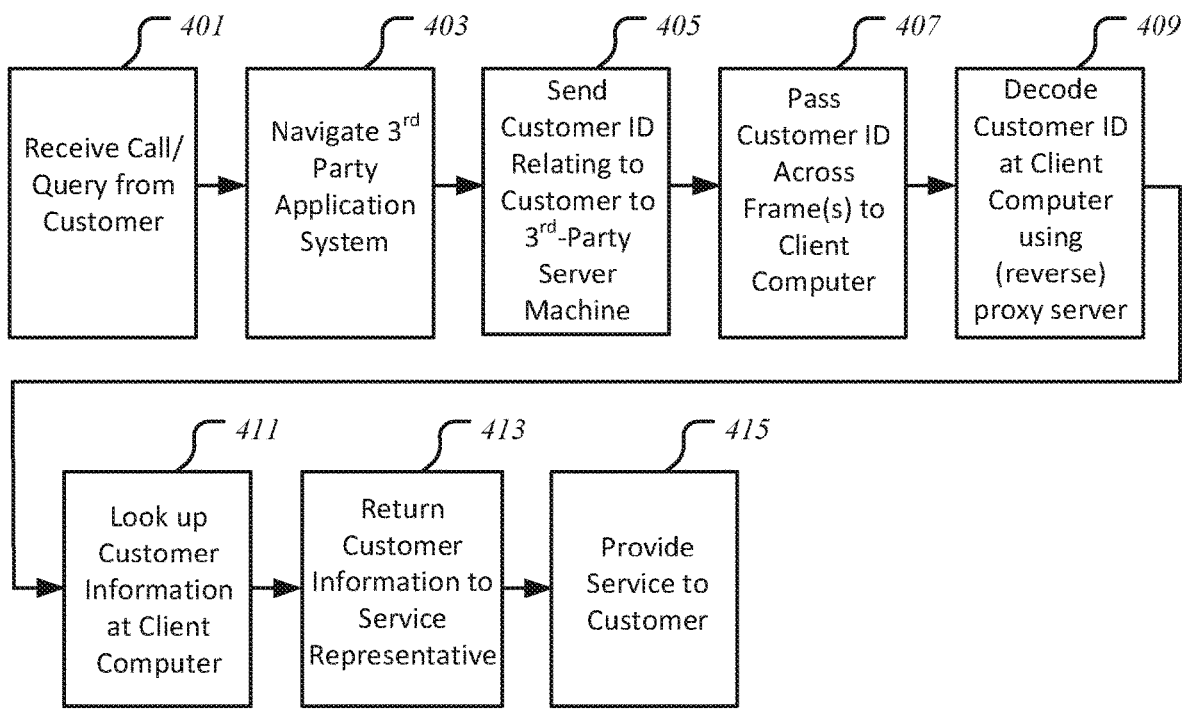
FIG. 4A illustrates a transaction sequence for facilitating security of data according to one embodiment.

FIG. 4A illustrates a transaction sequence 400 for facilitating security of data according to one embodiment. Transaction sequence 400 may be performed by processing logic that may comprise hardware (e.g., circuitry, dedicated logic, programmable logic, etc.), software (such as instructions run on a processing device), or a combination thereof. In one embodiment, transaction sequence 400 may be performed or facilitated by one or more components of security mechanism 110 of FIG. 2. The processes of transaction sequence 400 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated or discussed hereafter.

Transaction sequence 400 begins at block 401 with a customer/user placing a call/query (e.g., telephone call, data query, etc.) using a relevant application (e.g., phone application, search application, etc.) using an interface (e.g., web browser, etc.) provided at a client computer. At block 403, in response to the use of the relevant application and placement of the call/query, a third-party application system, such as an IVR/phone system, at a third-party computing device is triggered and navigated. At block 405, the third-party application system generates a securely encoded client/customer/user ID using any known customer information (e.g., name, date of birth, address, zip code, profession, etc.) and, at block 407, passes this customer ID across frames and over to the client computer. In one embodiment, this secure encoding may be performed using any one of encryption techniques offered by a proxy server and further using one or more tokens or encryption protocols offered by a token database in communication with the proxy server.

At block 409, the customer ID is securely decoded at the client computer using any one of encryption techniques offer by the proxy server and one or more tokens or encryption protocols offered by the token database within the geographic residency. At block 411, upon securely decoding the customer ID, the client computer may obtain the necessary data relating to the customer, which may be provided by the proxy server without having to access any of the remote server computers. At block 413, this customer information may then be returned to one or more service representative associated with a service provider (e.g., Salesforce.com®) such that service is offered to the customer by a service representative at block 415.

FIG. 4B illustrates a method 450 for facilitating security of data according to one embodiment. Method 450 may be performed by processing logic that may comprise hardware (e.g., circuitry, dedicated logic, programmable logic, etc.), software (such as instructions run on a processing device), or a combination thereof. In one embodiment, method 450 may be performed or facilitated by one or more components of security mechanism 110 of FIG. 2. The processes of method 450 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated or discussed hereafter.

Method 450 begins at block 451 with monitoring of data being communicated between multiple computing entities, application frames, etc., within a geographic residency. At block 453, any data being communication within a geographic residency is securely tokenized and/or encrypted using one or more tokenization and/or encryption techniques offered by a (reverse) proxy server in communication with a token database offering relevant tokens and/or encryption protocols for facilitating the secured the tokenization and/or encryption of the data. In one embodiment, at block 455, the (reverse) proxy server and/or the token database in the geographic residency are used to ensure that the communication of the tokenized and/or encrypted data, at least the tokenized and/or encrypted sensitive data, is securely performed between multiple computing entities (e.g., client computer, third-party server computer, etc.) within the geographic residency.

Similarly, in one embodiment, at block 457, the (reverse) proxy server and/or the token database in the geographic residency are used to ensure that the communication of the tokenized and/or encrypted data, at least the tokenized and/or encrypted sensitive data, is securely performed between multiple application frames (e.g., web browser, application screen, etc.) within the geographic residency. At block 459, the tokenized and/or encrypted data is securely is received, decrypted, and viewed at the client computer using one or more of encryption/decryption techniques via one or more interfaces via one or more display screens/devices associated with or communicatively coupled to the client computer.

Figure 5:
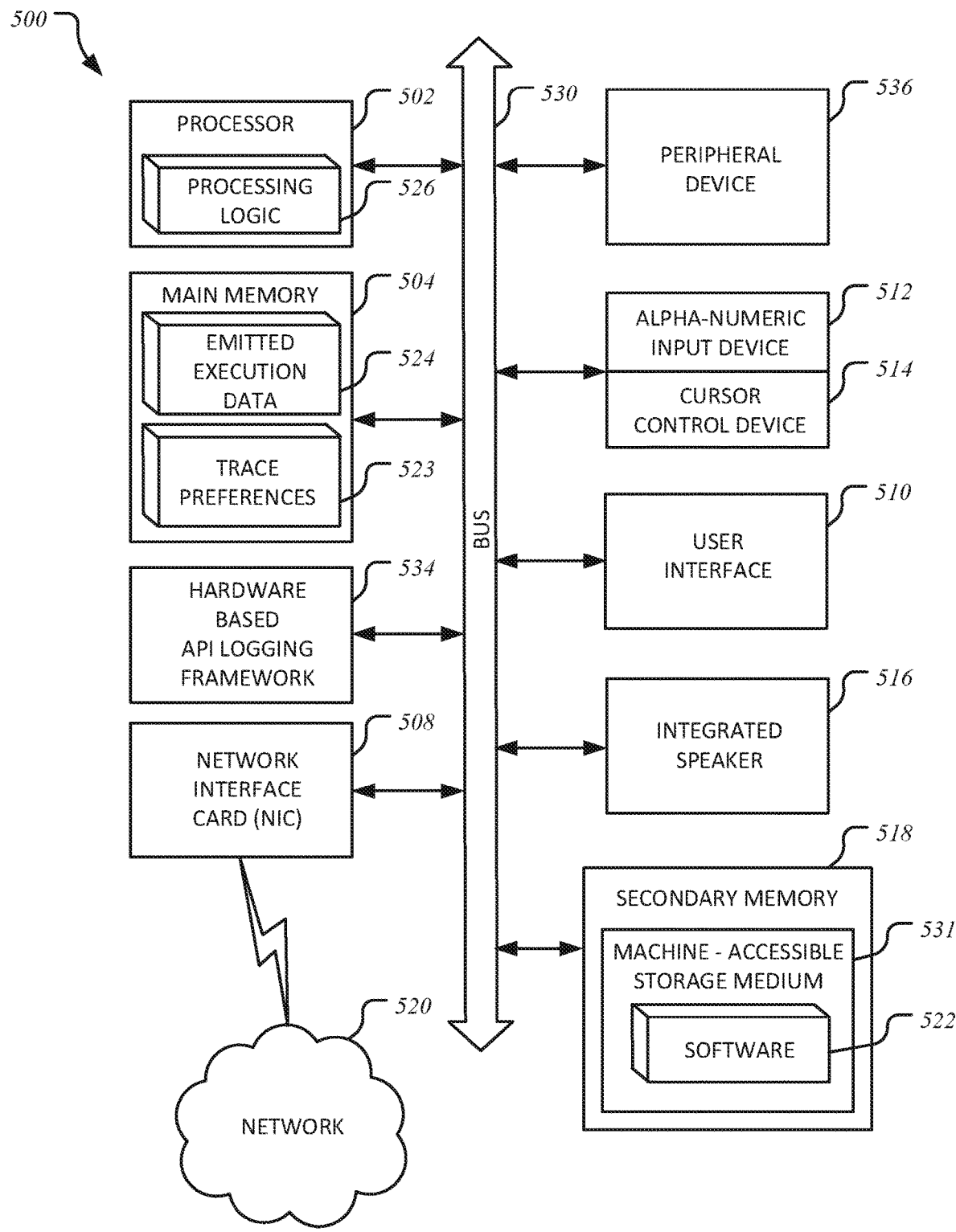
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing devices 120, 130A-N of FIG. 1. In alternative embodiments, the machine may be connected (e.g., networked) to other machines in a network (such as host machine 120 connected with client machines 130A-N over network(s) 135 of FIG. 1), such as a cloud-based network, Internet of Things (IoT) or Cloud of Things (CoT), a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of control mechanism 110 as described with reference to FIG. 1 and other Figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of control mechanism 110 as described with reference to FIG. 1, respectively, and other figures discussed herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
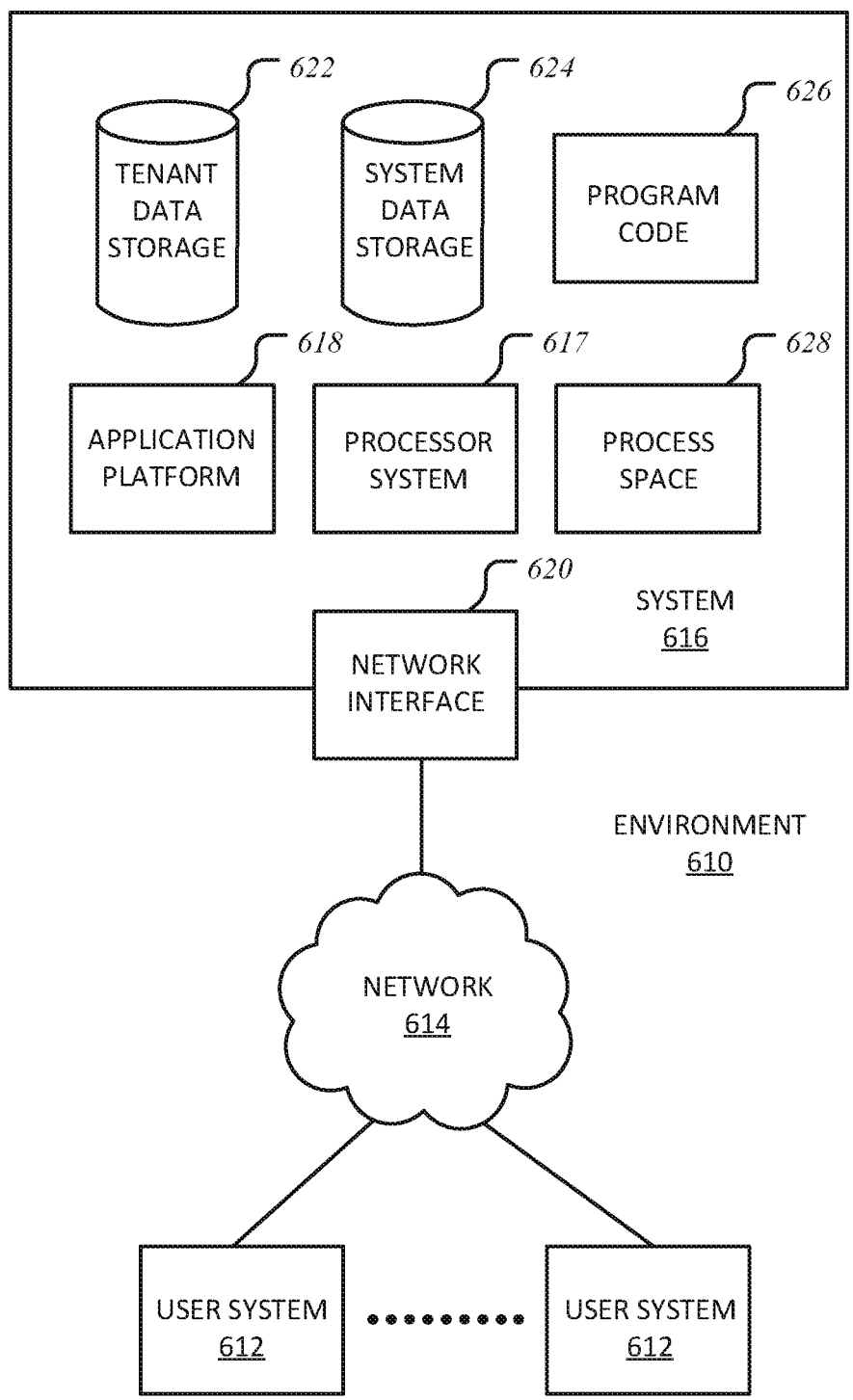
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a workstation, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load-sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database-indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
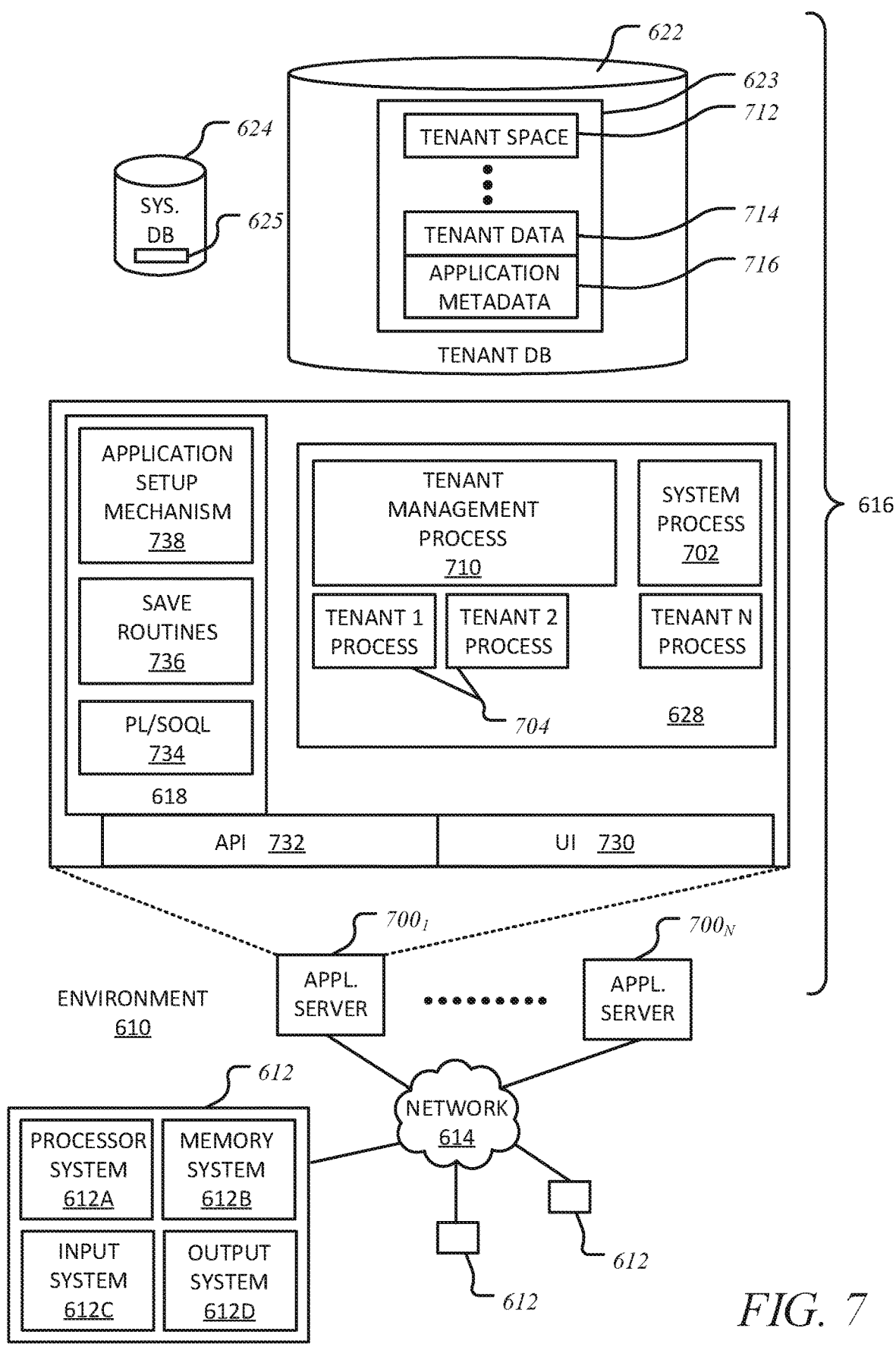
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A method comprising:
    detecting, by a server computing device in the database environment, sensitive data capable of being communicated between multiple client computing devices, wherein the server computing device serves as a local proxy server within a geographic residency and is coupled to a token database located within the geographic residency, wherein the token database is associated with a client computing device of the multiple computing devices;
    performing, by the server computing device, secured communication of the sensitive data between two or more of the multiple client computing devices across one or more application frames within the geographic residency, wherein the secured communication is performed based on localizing one or more communication paths associated with the two or more multiple computing devices and the one or more application frames as facilitated by the local proxy server within the graphics residency without having to access a centralized server computing device or engage one or more remotely-located security computing entities, wherein the local proxy server serves as a reverse proxy server within the geographic residency to associate the client computing device with the token database and one or more client computing devices of the multiple client computing devices; and wherein the secured communication is performed based on tokenization of the sensitive data and encryption of the sensitive data.

2. The method of claim 1, wherein one or more of the tokenization and the encryption are performed using one or more of tokens and encryption protocols, respectively, from the token database located within the geographic residency, wherein the secured data is received and de-tokenized or decrypted, respectively.

3. The method of claim 1, wherein the one or more application frames comprise one or more of a user interface, an application programming interface (API), and a Representational State Transfer (REST) API, wherein the user interface includes a Web browser providing access to an application screen, wherein the Web browser serves as a primary application frame, and wherein the application screen serves as a secondary application frame within the primary application frame.

4. A system comprising:
a server computing device having, a processor coupled to memory, the processor facilitating a mechanism to:
detect sensitive data capable of being communicated between multiple client computing devices, wherein the server computing device serves as a local proxy server within a geographic residency and is coupled to a token database located within the geographic residency, wherein the token database is associated with a client computing device of the multiple computing devices;
perform secured communication of the sensitive data between two or more of the multiple client computing devices and across one or more application frames within the geographic residency, wherein the secured communication is performed based on localizing one or more communication paths associated with the two or more multiple computing devices and the one or more application frames as facilitated by the local proxy server within the graphics residency without having to access a centralized server computing device or engage one or more remotely-located security computing entities, wherein the local proxy server serves as a reverse proxy server within the geographic residency to associate the client computing device with the token database and one or more client computing devices of the multiple client computing devices; and
wherein the secured communication is performed based on tokenization of the sensitive data and encryption of the sensitive data.

5. The system of claim 4, wherein one or more of the tokenization and the encryption are performed using one or more of tokens and encryption protocols, respectively, from the token database located within the geographic residency, wherein the secured data is received and de-tokenized or decrypted, respectively.

6. The system of claim 4, wherein the one or more application frames comprise one or more of a user interface, an application programming interface (API), and a Representational State Transfer (REST) API, wherein the user interface includes a Web browser providing access to an application screen, wherein the Web browser serves as a primary application frame, and wherein the application screen serves as a secondary application frame within the primary application frame.

7. A non-transitory machine-readable medium comprising a plurality of instructions which, when executed by a server computing device, cause the server computing device to perform operations comprising:
detecting sensitive data capable of being communicated between multiple client computing devices, wherein the server computing device serves as a local proxy server within a geographic residency and is coupled to a token database located within the geographic residency, wherein the token database is associated with a client computing device of the multiple computing devices;
performing secured communication of the sensitive data between two or more of the multiple client computing devices and across one or more application frames within the geographic residency and is coupled to a token database located within the geographic residency, wherein the secured communication is performed based on localizing one or more communication paths associated with the two or more multiple computing devices and the one or more application frames as facilitated by the local proxy server within the graphics residency without having to access a centralized server computing device or engage one or more remotely-located security computing entities, wherein the local proxy server serves as a reverse proxy server within the geographic residency to associate the client computing device with the token database and one or more client computing devices of the multiple client computing devices; and
wherein the secured communication is performed based on tokenization of the sensitive data and encryption of the sensitive data.

8. The non-transitory machine-readable medium of claim 7, wherein one Or more of the tokenization and the encryption are performed using one or more of tokens and encryption protocols, respectively, from the token database located within the geographic residency, wherein the secured data is received and de-tokenized or decrypted, respectively.

9. The non-transitory machine-readable medium of claim 7, wherein the one or more application frames comprise one or more of a user interface, an application programming interface (API), and a Representational State Transfer (REST) API, wherein the user interface includes a Web browser providing access to an application screen, wherein the Web browser serves as a primary application frame, and wherein the application screen serves as a secondary application frame within the primary application frame.

* * * * *

UNITED STATES PATENT AND TRADEMARK OFFICE
CERTIFICATE OF CORRECTION

PATENT NO.         : 10,659,433 B2
APPLICATION NO.    : 15/365875
DATED              : May 19, 2020
INVENTOR(S)        : Nathan E Tableman Page 1 of 1

It is certified that error appears in the above-identified patent and that said Letters Patent is hereby corrected as shown below:

On the Title Page

Item (74) Attorney, Agent, or Firm should read:
JAFFERY WATSON MENDONSA & HAMILTON LLP Signed and Sealed this
Twentieth Day of October, 2020

Andrei Iancu
*Director of the United States Patent and Trademark Office*